(12) United States Patent
Keshavachar et al.

(10) Patent No.: US 9,202,075 B2
(45) Date of Patent: Dec. 1, 2015

(54) SYSTEM AND METHOD FOR EXECUTING CODE SECURELY IN GENERAL PURPOSE COMPUTER

(75) Inventors: Bhaktha Ram Keshavachar, Carlsbad, CA (US); Navin Govind, Carlsbad, CA (US)

(73) Assignee: AVENTYN, INC., Carlsbad, CA (US)

( * ) Notice: Subject to any disclaimer, the term of this patent is extended or adjusted under 35 U.S.C. 154(b) by 1265 days.

(21) Appl. No.: 12/434,054

(22) Filed: May 1, 2009

(65) Prior Publication Data

US 2010/0281274 A1    Nov. 4, 2010

(51) Int. Cl.
*G06F 21/62* (2013.01)
*G06F 12/14* (2006.01)
*G06F 12/08* (2006.01)

(52) U.S. Cl.
CPC ........ *G06F 21/6209* (2013.01); *G06F 12/1408* (2013.01); *G06F 12/0802* (2013.01)

(58) Field of Classification Search
CPC .................................................. G06F 21/6209
See application file for complete search history.

(56) References Cited

U.S. PATENT DOCUMENTS 6,370,614 B1 * 4/2002 Teoman et al. ............... 711/113
2008/0092029 A1 * 4/2008 Arakawa et al. .............. 714/801

OTHER PUBLICATIONS

ARM, "ARM946E-S Technical Specification", Revision: r1p1, ARM, 2007.*
Elbaz et al.; A parallelized way to provide data encryption and integrity checking on a processor-memory bus; Published in: Proceeding DAC '06 Proceedings of the 43rd annual Design Automation Conference; 2006; pp. 506-509; ACM Digital Library.*
Fiskiran et al.; Runtime execution monitoring (REM) to detect and prevent malicious code execution; Published in: Computer Design: VLSI in Computers and Processors, 2004. ICCD 2004. Proceedings. IEEE International Conference on Date of Conference: Oct. 11-13, 2004; pp. 452-457; IEEE Xplore.*

* cited by examiner

*Primary Examiner* — Bradley Holder
(74) *Attorney, Agent, or Firm* — DLA Piper LLP (US)

(57) ABSTRACT

The various embodiments of the invention provide a method for executing code securely in a general purpose computer. According to one embodiment, a code is downloaded into a cache memory of a computer in which the code is to be executed. The code downloaded into the cache memory is encrypted in the cache memory. Then the encrypted code in the cache memory is decrypted using a decryption algorithm to obtain the decrypted code. The decrypted code is executed in the cache to generate a result. The decrypted code is destroyed in the cache memory after the forwarding the result to a user.

2 Claims, 2 Drawing Sheets

SYSTEM AND METHOD FOR EXECUTING CODE SECURELY IN GENERAL PURPOSE COMPUTER

BACKGROUND

1. Technical Field

The embodiments herein generally relate to sequestering of processors and more particularly to a system and a method for executing code securely in a general purpose computer.

2. Description of the Related Art

Pluralities of techniques are used for protecting the data and application in a computer. For example, cryptographic techniques are used to control the access to the data stored in the computer. The cryptographic techniques include encryption, decryption, authentication, signing and verification processes. In some applications the cryptographic techniques are used to authenticate the user in running the application and to prevent the loss of revenue. Several standards have been developed to enhance the level of security in executing the applications. For example, a trusted platform module (TPM) is developed to provide a set of cryptographic capabilities to execute the computer applications securely within the TPM environment such as hardware device like a subscriber identity module (SIM) card. The biggest disadvantage of this method is the initial cost, maintenance like replacing the lost/broken keys and the discomfort of carrying an extra physical device to run the software purchased bought by user.

None of the currently available security solutions provide a more robust and secure way of executing an application using only the software without initiating any change in the platform level.

Hence there is a need to develop a method to execute code securely in a general purpose computer using software based solutions and without requiring any change in the platforms to prevent the loss of revenue to a service provider.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concept of the invention in a simplified form as a prelude to the more detailed description that is presented later.

The various embodiments of the invention provide a method and system to execute a code securely in a general purpose computer. According to one embodiment of the invention, a method is developed to execute a code securely in a general purpose computer by using the micro architectural constructs such as caches, to hide the execution of code inside processor core thereby preventing the eaves droppers from getting access to execution details. According to one embodiment, a code is downloaded into a cache memory of a computer in which the code is to be executed. The code downloaded into the cache memory is encrypted in the cache memory. The contents of the cache memory are locked down with the main memory in the computer by using an interrupt behavior or by locking down the cache lines or by putting the cache into write back mode or by combining all the three processes. Then the encrypted code in the cache memory is decrypted using a decryption algorithm to obtain the decrypted code. The decrypted code is executed in the cache to generate a result. The decrypted code is destroyed in the cache memory after the forwarding the result to a user. The decrypted code is resident only in the cache memory of the computer.

According to another embodiment of the present invention, a memory interface unit is provided to interface the memory units like main memory, secondary storage systems such as hard disk, secure smart card, etc., with a central processing unit (CPU) provided with cache memory, buffers, prediction buffers and thread local buffer (TLB). The code is stored in the encrypted form in the main memory and in the secondary storage systems. The code stored in the encrypted form in the main memory or in the secondary storage systems is downloaded to the cache memory after locking down the cache memory with the main memory. The cache memory is locked to the main memory by using an interrupt behavior or by locking down the cache lines or by putting the cache into write back mode or by combining all the three processes. Then the code in the encrypted form is downloaded to the cache memory from the main memory or from the secondary storage systems. A decryption algorithm is generated in the cache memory using a unique identification data. The generated decryption algorithm is used to decrypt the downloaded code which is in the encrypted form. Then the decrypted code is executed in the cache itself to generate a result. After forwarding the generated result to the user, the decrypted code and the generated result are destroyed in the cache itself. Thus a secure environment is provided for executing a code in the general purpose computer.

Thus the various embodiments of the present invention provide a method to execute code securely in a general purpose platform. The method facilitates the secure execution of an arbitrary segment of code on existing platforms thereby providing a hidden execution process for the code, preventing the tampering of code, preventing the tampering of returned results and providing a run-time integrity verification process. The method uses the micro-architectural constructs like caches, to hide the execution inside a processor core thereby preventing the eaves dropper from getting access to the execution details.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Although specific features of the present invention are shown in some drawings and not in others. This is done for convenience only as each feature may be combined with any or all of the other features in accordance with the present invention.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
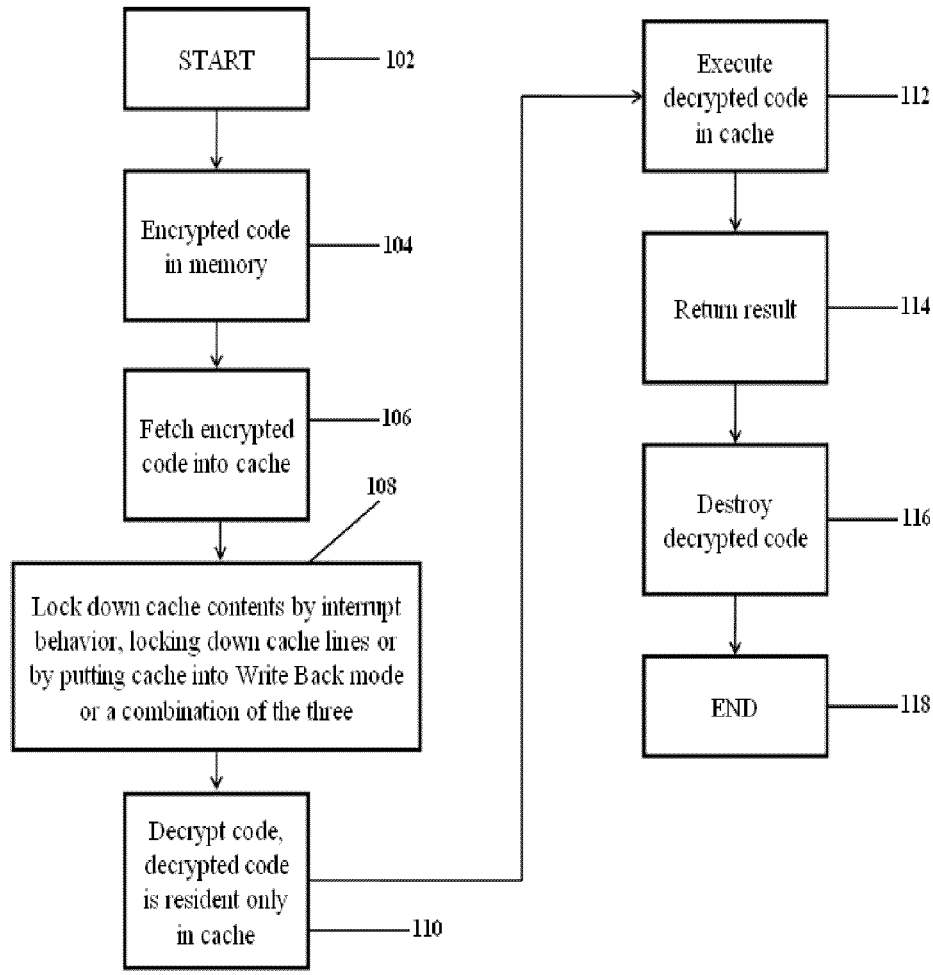
FIG. 1 illustrates a flow chart explaining the method for executing code securely in a general purpose computer according to one embodiment of the invention.

FIG. 1 illustrates a flow chart explaining the method for executing code securely in a general purpose computer according to one embodiment of the invention. With respect to FIG. 1, an encrypted code is downloaded to a memory of a computer (104). The code is downloaded into a cache memory of the computer. The code downloaded into the cache memory is encrypted in the cache memory (106). The contents of the cache memory are locked down with the main memory in the computer by using an interrupt behavior or by locking down the cache lines or by putting the cache into write back mode or by combining all the three processes (108). Then the encrypted code in the cache memory is decrypted using a decryption algorithm to obtain the decrypted code (110). The decrypted code is executed in the cache to generate a result (112). The generated result is forwarded to a user (114). The decrypted code is destroyed in the cache memory after the forwarding the result to a user (116). The decrypted code is resident only in the cache memory of the computer.

Figure 2:
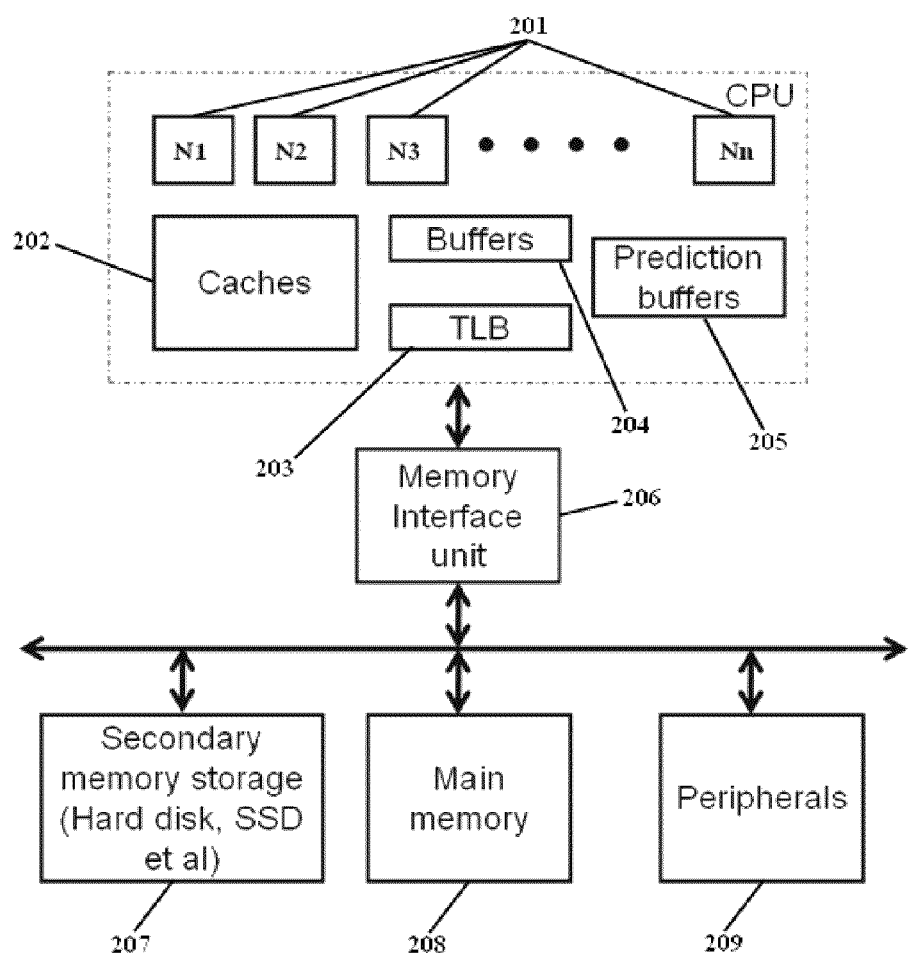
FIG. 2 illustrates a block diagram of a computer provided with a method for executing code securely, according to one embodiment of the present invention.

FIG. 2 illustrates a block diagram of a computer provided with a method for executing code securely, according to one embodiment of the present invention. With respect to FIG. 2, a memory interface unit 206 is provided to interface the memory units like main memory 208, secondary storage systems 207, such as hard disk, secure smart card, etc., and peripheral storage units 209 with a central processing unit (CPU) provided with cache memory 202, buffers 204, prediction buffers 205 and thread local buffer (TLB) 203. The code is stored in the encrypted form in the main memory 208 and in the secondary storage systems 207. The code stored in the encrypted form in the main memory 208 or in the secondary storage systems 207 is downloaded to the cache memory 202 after locking down the cache memory 202 with the main memory 208. The cache memory 202 is locked to the main memory 208 by using an interrupt behavior or by locking down the cache lines or by putting the cache into write back mode or by combining all the three processes. Then the code in the encrypted form is downloaded to the cache memory 202 from the main memory 208 or from the secondary storage systems 207. A decryption algorithm is generated in the cache memory 202 using a unique identification data. The generated decryption algorithm is used to decrypt the downloaded code which is in the encrypted form. Then the decrypted code is executed in the cache 202 itself to generate a result. After forwarding the generated result to the user, the decrypted code and the generated result are destroyed in the cache 202 itself. Thus a secure environment is provided for executing a code in the general purpose computer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

It is also to be understood that the following claims are intended to cover all of the generic and specific features of the present invention described herein and all the statements of the scope of the invention which as a matter of language might be said to fall there between.

What is claimed is:

1. A method for executing code securely in a computer having a cache memory, the method comprising:
   downloading a code into the cache memory of the computer in which the code is to be executed;
   encrypting the downloaded code in the cache memory;
   locking down the cache memory contents including the encrypted code to a main memory in the computer by combining usage of an interrupt behavior, locking down the cache lines and putting the cache memory into write back mode;
   decrypting, using a decryption algorithm in the cache memory, the encrypted code to obtain a decrypted code that is resident only in the cache memory;
   executing, in the cache memory, the decrypted code to generate a result;
   forwarding the generated result to a user; and
   destroying the decrypted code in the cache memory.

2. A computer having a cache memory for executing code securely, comprising:
   the cache memory of the computer into which a piece of code to be executed is downloaded and encrypted;
   a main memory of the computer to which the cache memory contents including the encrypted code are locked by combining usage of an interrupt behavior, locking down the cache lines and putting the cache memory into write back mode;
   the cache memory generating a decryption process via a decryption algorithm in the cache memory that decrypts the encrypted code to obtain a decrypted code that is resident only in the cache memory;
   a central processing unit executing, in the cache memory, the decrypted code to generate a result that is forwarded to a user; and
   the cache memory destroying the decrypted code.

* * * * *